United States Patent [19]

Buan et al.

[11] Patent Number: 4,500,780

[45] Date of Patent: Feb. 19, 1985

[54] APPARATUS AND METHOD FOR ALIGNING POSTAGE METER COMPONENTS WITH AN OPTICAL SENSOR

[75] Inventors: Danilo P. Buan, Easton; Alton B. Eckert, Norwalk, both of Conn.

[73] Assignee: Pitney Bowes Inc., Stamford, Conn.

[21] Appl. No.: 455,163

[22] Filed: Jan. 3, 1983

[51] Int. Cl.³ .............................................. G01D 5/34
[52] U.S. Cl. .......................... 250/231 SE; 340/347 P
[58] Field of Search .............. 250/231 SE; 340/347 P; 356/375

[56] References Cited

U.S. PATENT DOCUMENTS 3,994,589 11/1976 Nodwell et al. ................. 356/375 X
4,386,270 5/1983 Ezekiel ......................... 250/231 SE Primary Examiner—Edward P. Westin
Attorney, Agent, or Firm—Peter Vrahotes; William D. Soltow, Jr.; Albert W. Scribner

[57] ABSTRACT

A postage meter is provided with a mounting bracket with predetermined openings. Openings of the mounting bracket receive projections from an optical sensor to assure proper alignment of the optical sensor. Another opening in the plate receives the shaft of a stepper motor that has an encoder disk mounted thereon. Marks are provided on the optical sensor and the encoder disk through the use of which precise alignment of components and proper setting of the stepper motor may be achieved.

8 Claims, 3 Drawing Figures

APPARATUS AND METHOD FOR ALIGNING POSTAGE METER COMPONENTS WITH AN OPTICAL SENSOR

BACKGROUND OF THE INVENTION

In devices, such as electronic postage meters, a recently developed arrangement for setting print wheels has involved the use of stepper motors. Usually two such stepper motors are utilized wherein one operates to select the bank of a print wheel which is to be adjusted and the second controls the adjustment of such print wheel. An optical sensor is associated with each of the stepper motors so that the angular position of each stepper motor may be determined as well as the direction of rotation of such stepper motors. An obvious requirement for print wheel setting mechanisms is that the component thereof be accurately aligned.

One means of aligning such components is through the use of equipment such as an oscilloscope wherein an electronic determination may be made as to the proper alignment of the various components. The disadvantage of this type of alignment is that it requires a relatively large amount of time, sophisticated equipment, and a well trained electronic technician to operate such equipment. Obviously, it would be advantageous if a simple mechanical scheme could be utilized wherein the setting mechanism components of a postage meter may be aligned without the use of sophisticated electronic equipment and without requiring professionally trained electronic technicians to carry out the operations of alignment.

SUMMARY OF THE INVENTION

A scheme has been devised wherein proper alignment of various components of the setting mechanism of a postage meter may be accomplished in a mechanical fashion by unskilled personnel. This is achieved through the use of marks placed on various components of the print wheel setting mechanisms with a requirement that the marks achieve a given alignment when the setting mechanism is in its home position, this home position being defined by the setting mechanisms of such printing wheels being disengaged and intermediate the print wheels. Such alignment takes places during the assembling of the postage meter and thereafter no further alignment is required. Although a postage meter of the type to which the invention has application will have two setting units, one for selecting a bank on which adjustments are to be made and another unit for setting the print wheels, the invention will be described in association with one of the units only, it being understood that the same principles apply for both.

DETAILED DESCRIPTION OF THE PREFERRED EMBODIMENT

Figure 1:
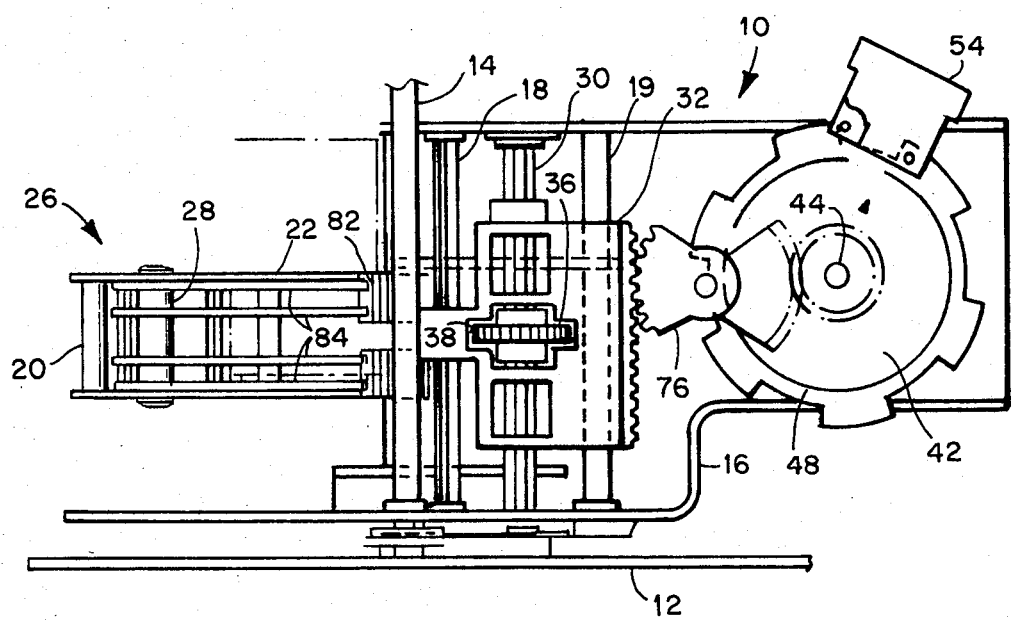
FIG. 1 shows a plan view of a postage meter setting mechanism wherein the present invention may be utilized.
Figure 2:
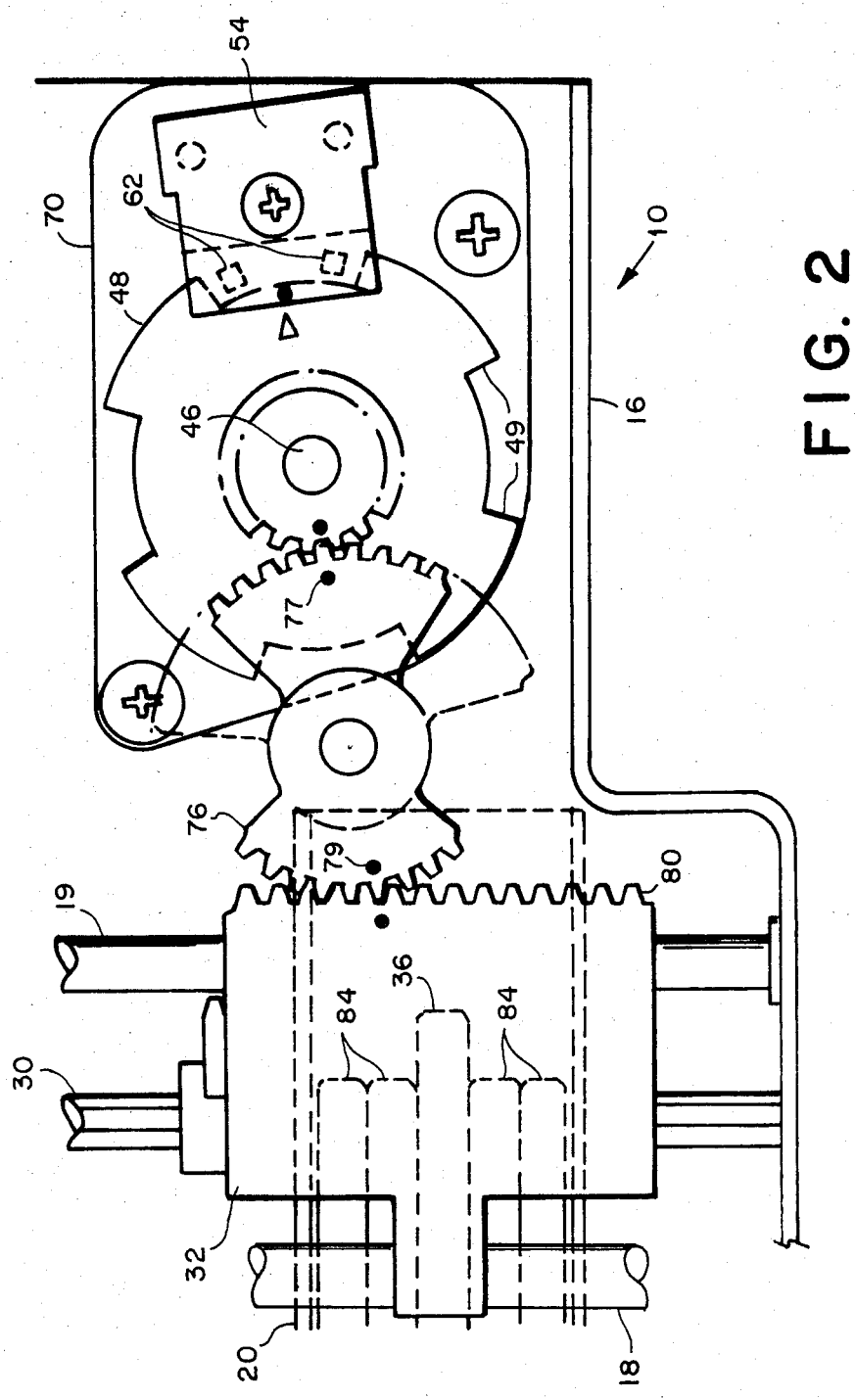
FIG. 2 shows a plan view of a portion of the setting mechanism shown in FIG. 1 showing portions of the setting mechanism in greater detail.

Referring now to the drawing, a setting mechanism for a mailing machine is shown generally at 10 located within a mailing machine housing partially shown at 12. This mailing machine is fully described in the Applicants' copending application entitled "Stand Alone Electronic Mailing Machine" filed Dec. 8, 1982 and having Ser. No. 447,815 which is hereby incorporated by reference and to which reference may be made for an environment in which the instant invention may be utilized. A wall 14 is located within the housing 12 and an extension bracket 16 is secured thereto. Received within and supported by the extension bracket 16 are a pair of shafts 18 and 19. A print bracket 20 is located within the extension bracket 16, the print bracket being rotatably mounted on the shaft 18. A print head shown generally at 26 is supported within the print bracket 20 by a shaft 28.

The extension bracket 16 rotatably supports a rotatable tri-lobe shaft 30 which is received within an opening 31 of a carriage 32 so that it may rotate therein without interference. The carriage 32 is slidably retained and guided by the shafts 18, 19 that are secured to the rectifier bracket 16. A selector gear 36 is mounted on the tri-lobe shaft 30 for rotation therewith and is disposed within an opening 38 of the carriage 32.

An electrical setting means in the form of a stepper motor 42 is mounted by the housing 12 and has a gear 44 with an alignment mark 45 thereon mounted on the output shaft 46 thereof. An optical encoder disk 48 having a plurality of slots 49 is also mounted on the output shaft 46 for determining the angular position of the gear 44, the encoder disc and stepper motor gear being integral with one another. An alignment mark 50 is located on the encoder disk at the center location of one of the slots 49. Determination of the angular disposition of the encoder disk 48 is accomplished with an optical sensor 54 that has a pair of opposed plates or walls 56 and 58 that defines a space or channel 57 therebetween. One wall 56 has an alignment mark 60 thereon. The encoder disk 48 is partially received within the channel 57. One wall 56 has a pair of light sources 62, for example, light emitting diodes, and the other wall 58 has a pair of light responsive devices 64, such as photocells, aligned with and addressing the light sources. The optical sensor 54 has a pair of guide pins 66 extending therefrom that are received within measured openings 68 of a mounting bracket 70 that is secured to the housing by bolts 72. The optical sensor 54 is secured to the mounting bracket 70 by a bolt 74, again received within a measured opening 75. The output shaft 46 is received within another opening 71 of the mounting bracket 70, the opening 71 have a bearing 73 therein. It will be appreciated that the stepper motor 42 and mounting bracket may be one unitized piece.

A segmented gear 76 is mounted on a shaft 78 and meshingly engages the stepper motor gear 44, the shaft 78 being rotatably supported by the housing 12. The segmented gear 76 has a pair of alignment marks 77, 79 at opposite radial ends thereof. The carriage 32 has teeth 80 thereon that are engaged by the segmented gear 76 whereby the carriage may be moved along the shafts 18, 19 upon rotation of the segmented gear 76. The carriage also has an alignment mark 81 therein.

As stated previously, the tri-lobe shaft 30 is rotatably supported by the extension bracket 16 and has mounted thereon the gear 36. The gear 36 is selectively engageable with teeth 82 located at one longitudinal end of four racks 84, which racks have lower teeth (not shown) at the other longitudinal end thereof. The lower teeth of each rack 84 engage gears (not shown) that are integral with print wheels (not shown), there being a corresponding print wheel for each rack. By movement of a rack 84, its corresponding print wheel will be rotated as is well known in the art. Since such adjustment of the print wheels does not form part of the instant invention it will not be described herein.

Movement of the carriage 32 is accomplished by incremental rotation of the gear 44 which in turn will rotate the segmented gear 76 thereby causing the carriage 32 to slide along the shafts 18, 19. The position of the carriage 32 is determined by the optical sensor 54 that senses the angular displacement of the encoder disk 48 mounted on the output shaft 44 of the stepper motor 42. As each rack 84 is addressed by the selector gear 36 through actuation of the stepper motor 42, the print wheels of the print head 26 may be placed it into selected positions by movement of a selected rack. This movement of a selected rack 84 is occasioned by the rotation of the selector gear 36 upon rotation of the tri-lobe shaft 30 by appropriate means. The teeth of the selector gear 36 engage the upper teeth 82 of the particular rack 84 being acted upon to move it longitudinally to a selected position. After a print wheel is set into its selected position, selector gear 36 is moved by translation of the carriage 32 along the shafts 18, 19 onto the next rack 84 until the entire print head 26 has been set.

The stepper motor 42 is provided with the optical encoder disk 48 to permit determination of the setting of the carriage 32. Additionally, a determination can be made of the direction of rotation of the stepper motor by the sequence in which the lights 62 are exposed as a consequence of the slots 49. The slots 49 have a length substantially equal to the distance between the lights 62. As stated previously, the sensor 54 has a pair of guide pins 66 thereon that are adapted to fit within the openings 68 of the mounting bracket 70. In this way, proper alignment of the optical sensor 54 is assured. The upper wall 56 of the sensor 54 has the mark 60 thereon that is used for the purpose of obtaining the proper setting of the encoder disk 48. This is accomplished by aligning the mark 50 on the optical encoder disk 48 when the encoder disk is loosely mounted upon the shaft 46 though use of an alignment jig 88.

Figure 3:
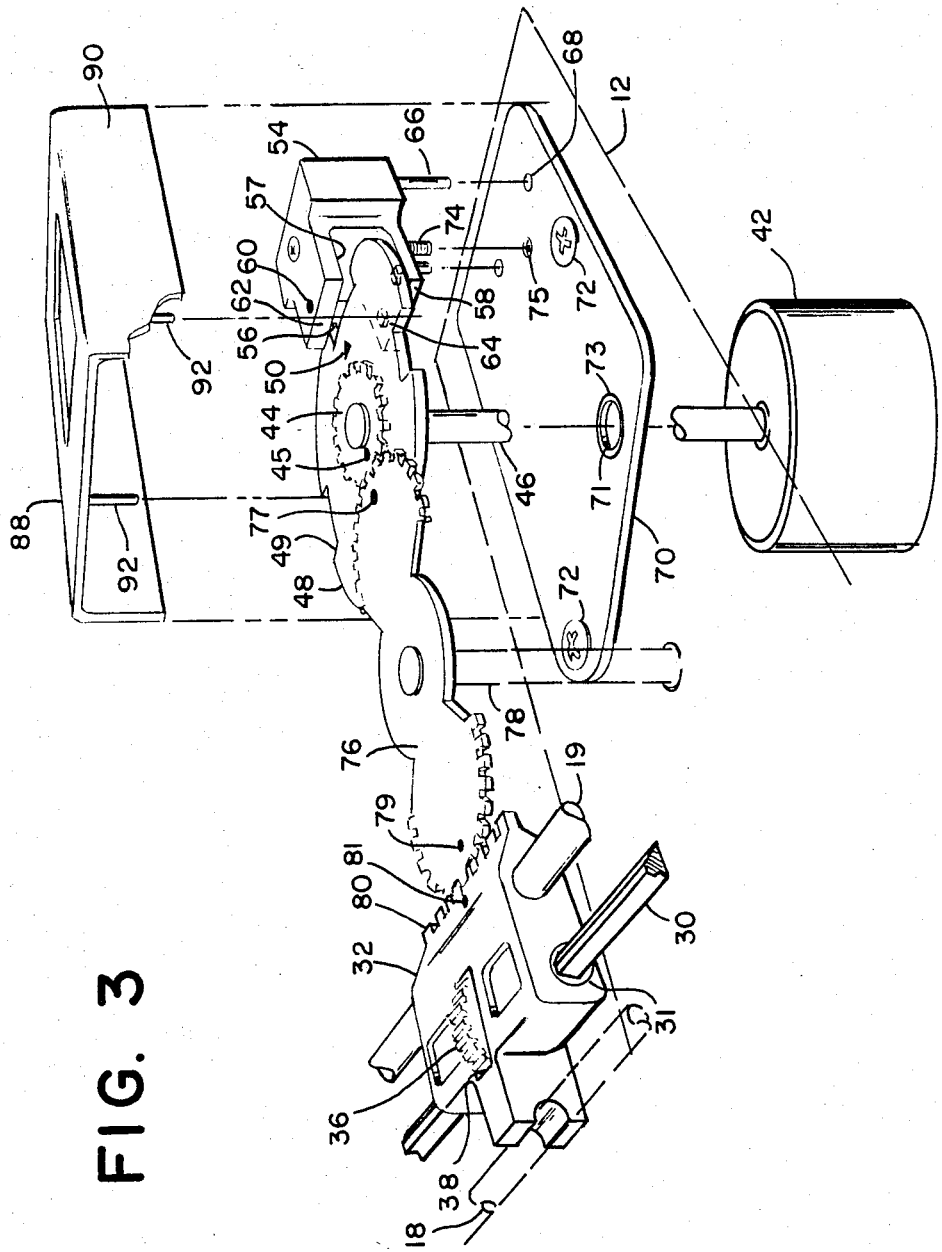
FIG. 3 shows a prospective view of a portion of the setting mechanism show in FIG. 2.

The alignment jig 88 is shown in FIG. 3 and has a frame 90 that is adapted to be snugly fit over the edges of the mounting bracket 70. A pair of posts 92 extend into the interior of the jig frame 90 and are adapted to be snugly received within a slot 49 of the encoder disk 48 with the posts touching the opposite sides of the slot. Upon such positioning of the encoder disk 49, the disk mark 50 will be in alignment with the sensor mark 60. Power is supplied to at this time to the stepper motor 42 to increase the magnetic detenting for that position. While power is still applied to the stepper motor 42, the loosely fitting encoder disc 48 would be secured to the shaft 46 by use of cement or any other convenient means, after which the power to the stepper motor 42 is terminated. Upon termination of power, the stepper motor 42 will be in the home position and adapted to move in increments as is well known in the art. Thereafter, the segmented gear 76 is placed upon the shaft 78 with its alignment mark 77 in alignment with the alignment mark 75 and the stepper motor gear 44. Because of the meshing of the gear teeth on the segmented gear 76 and the stepper motor gear 44, the alignment thereof will be self adjusting. The alignment marks 79 and 81 of the segmented gear 76 and carriage, respectively, are aligned and, again, because of the meshing of the teeth 80 with the teeth of the segmented gear, the alignment is self adjusting. After the entire setting mechanism 10 has been assembled as described, the sensor mark 60 and encoder disk mark 50 will fall on a straight line that passes through the center of rotation of the shafts 46. The gear mark 45 and segmented gear mark 77 will be in alignment with one another as will the segmented gear mark 79 and carriage mark 81. It will be appreciated, however, that alignment of the optical sensor mark 60 and the encoder disk mark 50 is the most important alignment in the setting mechanism 10.

What is claimed is:

1. An optical sensor for sensing the position of a selector gear in a postage meter of the type having a plurality of print wheels with gears integral therewith, a plurality of slidable racks, each of the racks engaging a print wheel gear, a slidable carriage having the selector gear movable therewith for engagement with a selected one of the racks, the carriage having a home position located intermediate and out of engagement with the racks, and a stepper motor for slidingly driving the carriage, the combination comprising: a mounting bracket located within the meter, said mounting bracket having a plurality of openings therein, an optical sensor, a pair of opposed walls extending from said optical sensor and forming a channel therebetween, a pair of alignment pins extending from one side of said optical sensor, said alignment pins being received with openings of said mounting bracket, a pair of lights mounted on one of said walls on the side of said channel, a pair of photocells mounted on the second of said walls and addressing said lights, an alignment mark located on the side of said optical sensor opposite said projections and intermediate the location of said lights, an encoder disk mounted on the output shaft of the stepper motor, said disk having an alignment mark thereon, a stepper motor gear integral with said encoder disk and having an alignment mark thereon, a segmented gear mounted for rotation within said meter, the carriage having teeth thereon, said segmented gear having a pair of alignment marks thereon and being in engagement with said stepper motor gear and with the carriage teeth, the carriage having a mark thereon whereby upon the carriage being in the home position, said optical sensor mark and said encoder disk mark are aligned, said stepper motor gear mark and one of said segmented gear marks are aligned, and said carriage mark is aligned with the other of said segmented gear marks.

2. An optical sensor for sensing the position of a selector gear in a postage meter of the type having a plurality of print wheels with gears integral therewith, a plurality of slidable racks, each of the racks engaging a print wheel gear, a slidable carriage having the selector gear movable therewith for engagement with a selected one of the racks, the carriage having a home position located intermediate and out of engagement with the racks, and a stepper motor for slidingly driving the carriage, the combination comprising: a mounting bracket located within the meter, said mounting bracket having a plurality of openings therein, an optical sensor, a pair of opposed walls extending from said optical sensor and forming a channel therebetween, a pair of alignment pins extending from one side of said optical sensor, said alignment pins being received with openings of said mounting bracket, a pair of lights mounted on one of said walls on the side of said channel, a pair of photocells mounted on the second of said walls and addressing said lights, an alignment mark located on the side of said optical sensor opposite said projections and intermediate the location of said lights, an encoder disk mounted on the output shaft of the stepper motor, said disk having an alignment mark thereon, a stepper motor gear integral with said encoder disk, a segmented gear mounted for rotation within said meter, the carriage having teeth thereon, said segmented gear being in engagement with said stepper motor gear and with the carriage teeth whereby upon the carriage being in the home position said optical sensor mark and said encoder disk mark will be aligned.

3. A setting apparatus for selecting the position of a slidable carriage which has a home position, the combination comprising: a mounting bracket having a plurality of openings therein, an optical sensor having a pair of opposed walls extending therefrom to form a channel therebetween, a pair of alignment pins extending from one side of said optical sensor, said alignment pins being received within openings of said mounting bracket, a pair of lights mounted on one of said walls on the side of said channel, a pair of photocells mounted in the second of said walls and addressing said lights, a mark located on the side of said optical sensor opposite said projections and intermediate the location of said lights, an encoder disk having a plurality of slots therein mounted on the output shaft of one stepper motor, said encoder disk having an alignment mark thereon, a stepper motor gear integral with said encoder disk and having an alignment mark thereon, a transfer gear having a pair of alignment marks thereon and being in engagement with said stepper motor gear and in driving engagement with the slidable carriage, the slidable carriage having a mark thereon whereby upon said slidable carriage being in the home position, said optical sensor mark and said encoder disk mark are in alignment with one another, said stepper motor gear mark and one of said transfer gear marks are in alignment with one another, and said carriage mark and the other of said transfer gear marks are in alignment with one another.

4. The apparatus of claim 5 wherein said encoder disk has a plurality of circumferentially spaced slots, said slots having a peripheral dimension substantially equal to the distance between said lights on said sensor.

5. A setting apparatus for selecting the position of a slidable carriage which has a home position, the combination comprising: a mounting bracket having a plurality of openings therein, an optical sensor having a pair of opposed walls extending therefrom to form a channel therebetween, a pair of alignment pins extending from one side of said optical sensor, said alignment pins being received with openings of said mounting bracket, a pair of lights mounted on one of said walls on the side of said channel, a pair of photocells mounted in the second of said walls and addressing said lights, a mark located on the side of said optical sensor opposite said projections and intermediate the location of said lights, an encoder disk having a plurality of slots therein mounted on the output shaft of one stepper motor, said encoder disk having an alignment mark thereon, a stepper motor gear integral with said encoder disk, a transfer gear being in engagement with said stepper motor gear and in driving engagement with the slidable carriage, whereby upon said slidable carriage being in the home position, said optical sensor mark and said encoder disk mark will be aligned with one another.

6. The apparatus of claim 2 wherein said encoder disk has a plurality of circumferentially spaced slots, said slots having a peripheral dimension substantially equal to the distance between said lights on said sensor.

7. In a method of assembling a setting mechanism in a postage meter having a mounting bracket with a plurality of openings supported therein; an optical sensor having a pair of opposed walls extending therefrom that form a channel therebetween, a pair of alignment pins, a pair of lights mounted on one of the walls on the side of said channel, a pair of photocells mounted in the second of said walls addressing the lights and an alignment mark located on the side of said optical sensor opposite said projections and intermediate the location of said lights; a stepper motor; an encoder disk having an alignment mark thereon attached to the output shaft of the stepper motor; and that has the steps comprising: placing the alignment pins of the optical sensor into the openings of the mounting bracket securing the optical sensor to the mounting bracket, placing the optical encoder into the channel of the optical sensor and onto the output shaft of the stepper motor, aligning the alignment mark of the encoder disk with the alignment mark on the optical sensor and securing the encoder disk to the output shaft.

8. The method of claim 7 including the steps of supplying power to the stepper motor before and during alignment of the encoder disk mark and optical sensor mark, and terminating power to the stepper motor after the encoder disk has been secured to the stepper motor output shaft.

* * * * *